May 29, 1956 J. H. CALBECK 2,747,966
PROCESS OF MANUFACTURING PIGMENT ZINC OXIDE
Filed Sept. 4, 1951 4 Sheets-Sheet 1

INVENTOR
John H. Calbeck
BY Cameron, Kerkam & Sutton
ATTORNEYS

May 29, 1956  J. H. CALBECK  2,747,966
PROCESS OF MANUFACTURING PIGMENT ZINC OXIDE
Filed Sept. 4, 1951  4 Sheets-Sheet 2
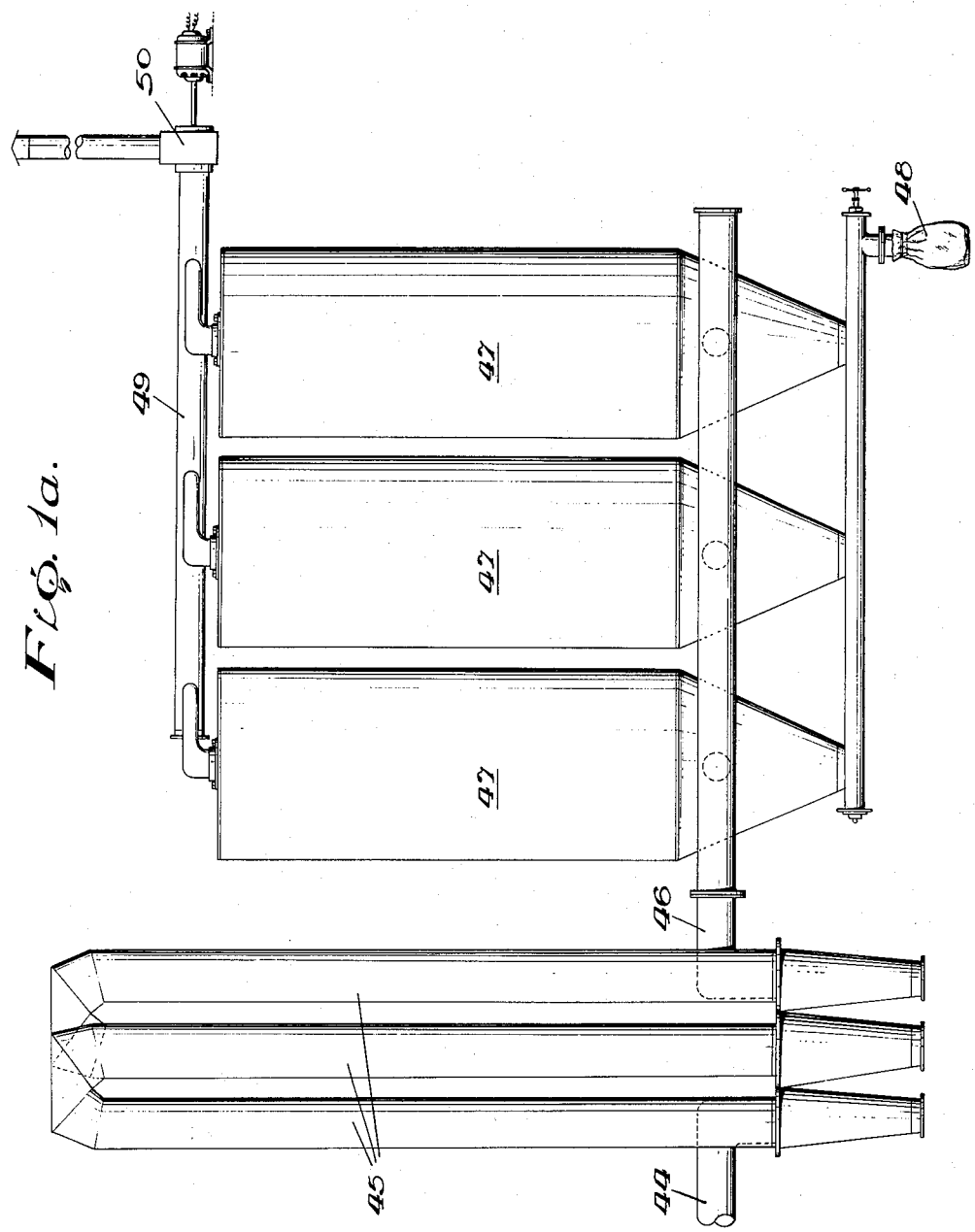
INVENTOR
John H. Calbeck
BY Cameron, Kerkam & Sutton
ATTORNEYS

United States Patent Office 2,747,966
Patented May 29, 1956

2,747,966

PROCESS OF MANUFACTURING PIGMENT ZINC OXIDE

John H. Calbeck, Columbus, Ohio, assignor to American Zinc, Lead & Smelting Company, St. Louis, Mo., a corporation of Maine Application September 4, 1951, Serial No. 244,951

9 Claims. (Cl. 23—148)

This invention relates to processes for the production of pigment quality zinc oxide, commonly known as American process zinc oxide, in which the zinc oxide is obtained from oxidized zinciferous materials using gaseous agents such as methane for reducing the zinciferous materials after heating and preferably utilizing direct heating of these materials by such gaseous agents. Still further, this invention relates to such a process in which the zinciferous materials may be maintained in fluidized condition during the heating and reducing steps and in which the heating and reducing steps may be automatically alternated during the process. Still further, this invention relates to such a process in which no solid carbonaceous reduction fuel need be employed and the gaseous reducing agent alone may be utilized for this purpose.

Heretofore various patents have issued for the production of metallic zinc utilizing gaseous reducing agents such as U. S. Patents Nos. 1,961,424 and 1,961,425. In these patents, however, the process was impractical because external heat was used which required excessive quantities of fuel and the reduction rates were slow with side reactions resulting in pollution of the equipment and impurities in the metallic zinc. Another patent, No. 1,014,062, discloses the use of liquid or gaseous hydrocarbons for heating and reduction in a rotary furnace. Some solid fuel was admixed with the calcines to expedite reduction and excessive amounts of heating fuel were required. Temperatures as high as 1800° C. were used in the commercial embodiments of the process of this patent and these temperatures are destructive to the furnace.

In the present invention the disadvantages of the prior art are overcome and a highly efficient process is obtained for making pigment zinc oxide. In the preferred embodiment of my process the zinciferous ores are comminuted to proper size, preferably 20 mesh with the percentage of fines passing 325 mesh not exceeding 30%, and the material is then pre-heated by the hot gases coming from the heating and reducing zone. The pre-heated comminuted material then passes into a heating and reducing zone where it is maintained in fluidized condition by a mixture of gases and air admitted to the zone at sufficient velocity for this purpose. While in this fluidized condition the material is first heated to an appropriate reducing temperature, on the order of 1100–1300° C., by combustion of a gaseous mixture comprising a hydrocarbon gas, such as methane, and air acting on the charge as a direct flame. Then the amount of oxygen in the mixture is reduced and the excess hydrocarbon gas reduces the zinc oxide present in the fluidized material, this zinc passing from the zone of fluidization as a vapor of metallic zinc. Immediately above the fluidized zone the metallic zinc vapor is met by a blast of air which partially oxidizes the same and at the same time provides heat to the fluidized zone beneath. Such immediate partial oxidation of the zinc vapor prevents the formation of blue powder and prevents the growth of "rock oxide" in the equipment. Thereafter the metallic zinc vapor and any zinc oxide is conducted with the other gases from the reduction zone over the comminuted zinciferous material to be pre-heated. More air is supplied to the metallic zinc vapor, zinc oxide and other gases in the pre-heating zone and this mixture passes from the pre-heating zone into a combustion zone in which the metallic zinc vapor is completely burned to zinc oxide of pigment quality. From the combustion zone the gases and zinc oxide are taken to the usual cooling tubes and bag filters which deliver the pigment zinc oxide to an appropriate packer and discharge the clean spent combustion gases to air.

I have found that I obtain better fluidization of the comminuted zinciferous material by utilizing larger particle size than commonly employed in fluidization systems and at the same time by admitting the hydrocarbon gas and air both for heating and for reducing at higher velocities than have heretofore been used. A conventional perforated or foraminous plate may be used to conduct the gases to the material to be fluidized so long as gas velocities and structure of the plate are such that clogging of the perforations by the zinciferous material is avoided. However, I prefer to improve fluidization by employing mechanical agitation, as by a rotating tuyere, at the bottom of the fluidization zone. This tuyere may have paddles for mechanically agitating the heavier particles finding their way to the bottom of the fluidization zone. To further increase the agitation of the heavier particles which migrate to the bottom of the fluidization zone and to prevent the heavy vapors of metallic zinc from passing downward in the fluidization zone I employ a blast of air, referred to hereinafter as "bottom air," which enters the fluidization chamber beneath the rotating tuyere and passes upwardly into the fluidization zone. The construction of the novel rotating tuyere and the employment of bottom air while generally described in the present application is described in detail and is claimed in the co-pending application of John H. Calbeck, Henry B. Klimper, and Richard J. Mernitz, filed concurrently herewith, where it is shown that the ratio of bottom air to tuyere air is approximately 1:10.

The novel process described generally above results in much higher recoveries of pigment zinc oxide because the ashless character of the fuel reduces the amount of clinker and the zinc loss in clinker. The more efficient reducing action of the process results in lower fuel costs. The lower reduction temperatures which are thermodynamically possible with the use of hydrocarbon gases such as methane instead of solid carbonaceous reducing material result in less slagging and longer furnace life with lower installation and maintenance cost. The automatic operation of the process reduces labor and operational cost. The lower reduction temperature produces a pigment zinc oxide of a color which is not degraded by the lead, copper and other impurities in the ore. The volume of blast and auxiliary air required in this process is considerably less than that required when solid carbonaceous fuels are employed and the furnaces, cooling tubes, bag houses and the like can be reduced to approximately one half the usual size. The residues from the fluidization zone can be more radily treated for the recovery of zinc values.

It is accordingly the object of the present invention to provide novel processes for obtaining pigment zinc oxide by the direct heating and reduction of comminuted zinciferous materials preferably in fluidized condition and employing a hydrocarbon gas, such as methane, as the heating and reducing agent, in which the heating and reducing steps may be cycled, to obtain the several advantages discussed above without employing solid carbonaceous fuels and without the use of external heat.

It should be noted that the present invention may be practiced in any convenient type of fluidization reaction chamber, but I prefer to practice the novel process of the present invention in a fluidization reaction chamber as described hereinafter. Various mechanical equipment and constructions may be employed for practicing this process and an illustrative form of the same is shown in the accompanying drawings. The particular form of apparatus disclosed in the drawings should not be construed as defining or limiting the present invention and reference should be had to the appended claims to determine the scope of the same.

In the accompanying drawings, in which like reference characters indicate like parts, Fig. 1 is an elevation of a portion of suitable apparatus for carrying out the novel process of the present invention, including a suitable fluidization reaction chamber with a rotating mechanical tuyere; a long hearth in communication with the fluidization chamber for pre-heating the comminuted zinciferous material; a combustion chamber for completing the burning of the zinc vapor; and apparatus, shown schematically, for providing the mixtures of gases for heating and reducing the material in the fluidization zone;

Figure 1:
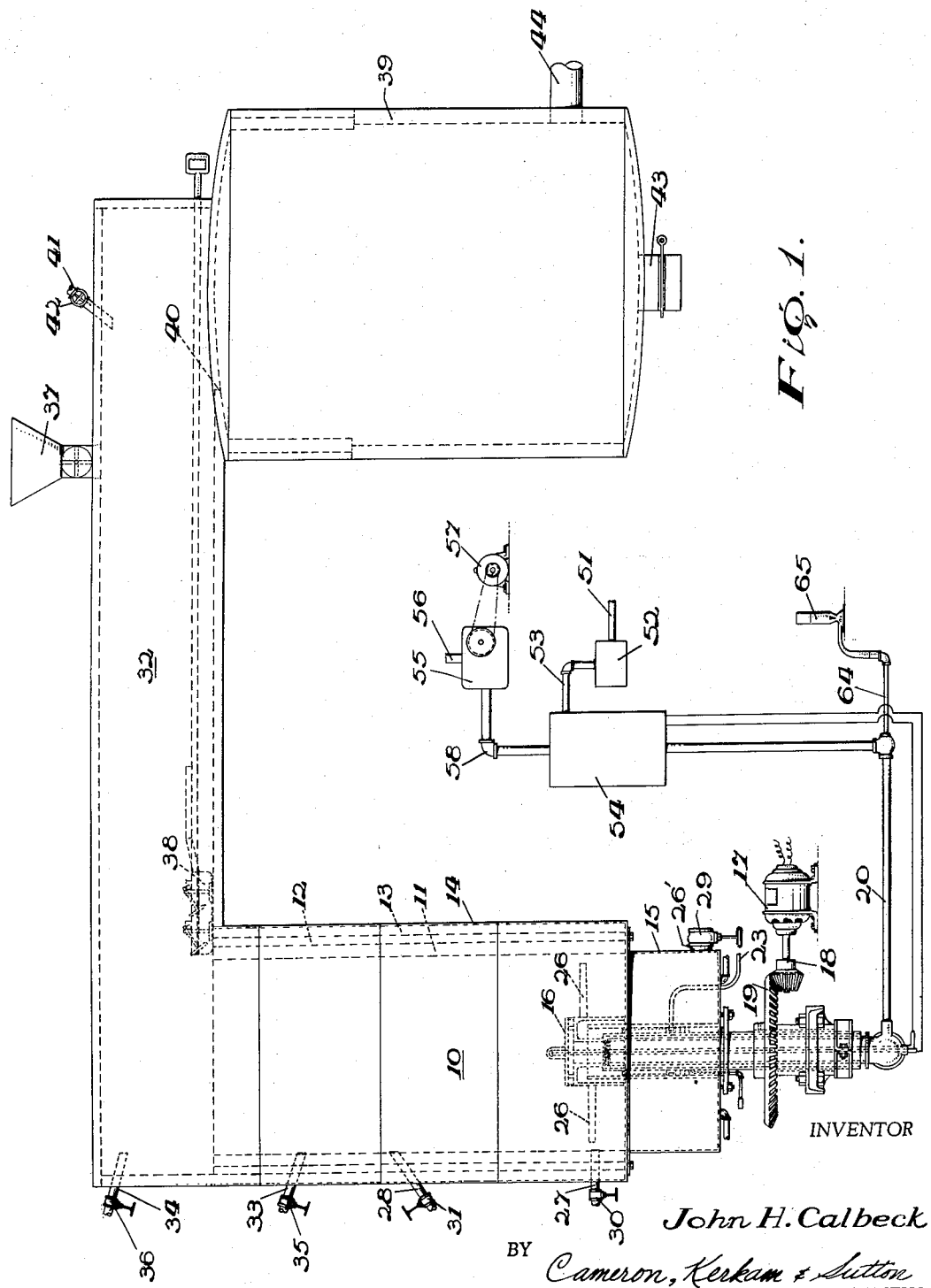
Fig. 1a is a continuation of the apparatus of Fig. 1 showing cooling tubes, bag filters and a packer for the pigment zinc oxide.
Figure 2:
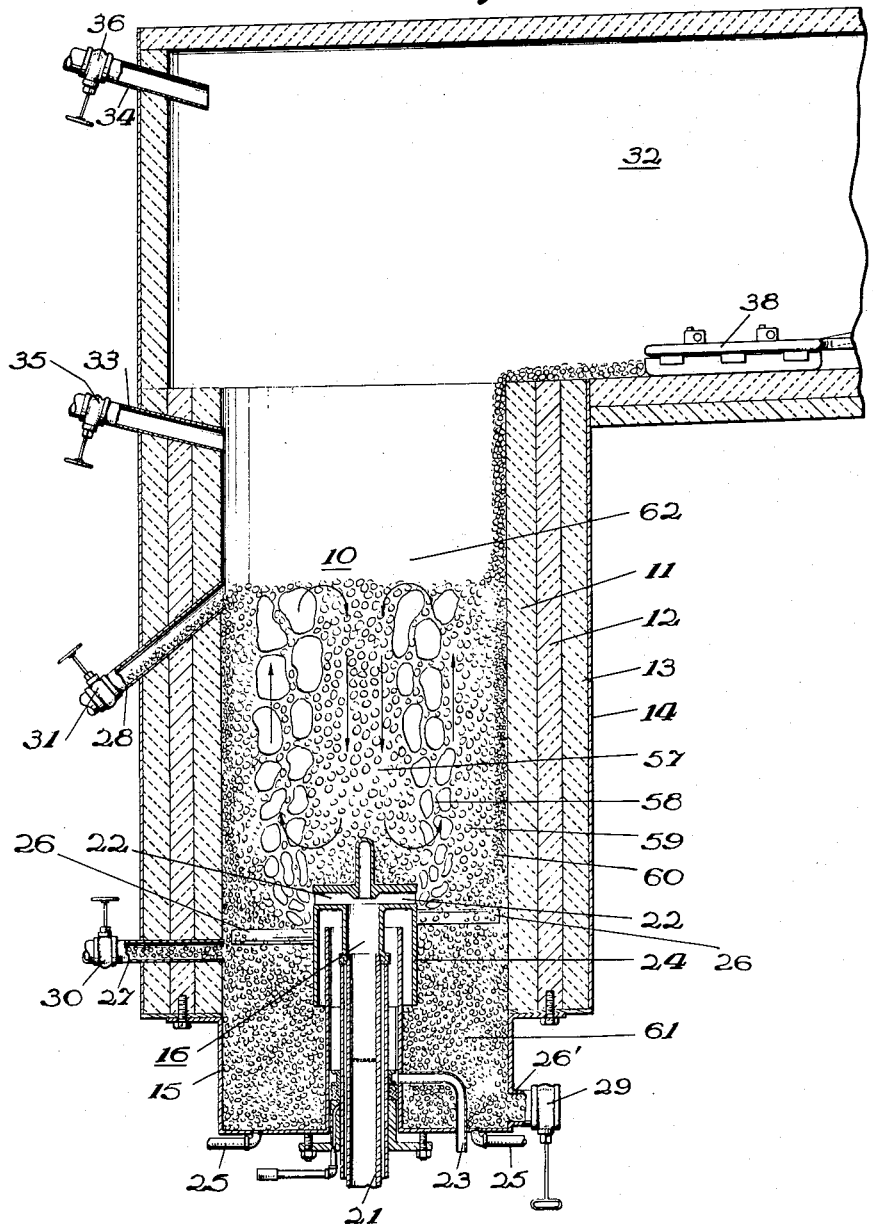
Fig. 2 is an enlarged detail of a portion of Fig. 1 showing the fluidization reactor and illustrating the fluidized condition of the particles of zinciferous material therein.

Referring now more particularly to Figs. 1, 1a, and 2, a suitable fluidization chamber 10 is provided with a lining of refractory material 11, an insulation layer 12, and a layer 13 of suitable material such as brick, all enclosed within an outer metallic casing 14. The lower end of fluidization chamber 10 is closed by a metallic pan 15 in which is mounted a rotatable tuyere generally indicated at 16. Tuyere 16 is rotated by an electric motor 17 and driving gears 18 and 19. Tuyere 16 is preferred but a perforated or foraminous plate could be used instead.

The gases for heating and reducing the zinciferous material in fluidization chamber 10 are supplied through pipe 20 to the hollow interior 21 of tuyere 16 and pass upwardly therethrough to discharge nozzles 22 formed in the upper head of the tuyere 16. Air is admitted to tuyere 16 through pipe 23 and passes into the material around tuyere 16 from beneath the skirts 24 to agitate this material. Bottom air may also be admitted to the material around tuyere 16 through pipes 25 and this construction in conjunction with the action of rotating paddles 26, which are mounted on the head of tuyere 16, provides sufficient agitation of the heavier particles collecting at the bottom of chamber 10 to prevent clogging of the equipment. It should also be noted that introduction of air through pipes 23 and 25 prevents migration of the heavy zinc vapors downwardly in chamber 10 where they would condense to form lumps and accretions which would eventually destroy the fluidization of the charge. This construction employing mechanical agitation requires relatively few jets or tuyeres of large diameter in the place of the usual foraminous plates heretofore employed for introducing gases into fluidization chambers and minimizes clogging of the openings through which the gases necessary to support fluidization are admitted.

Since fluidized materials exhibit many of the properties of liquids including static head and flow they may be removed from the fluidization chamber 10 through pipes such as pipes 26', 27 and 28 which are controlled by valves 29, 30 and 31 respectively. Since the process of the present invention is continuous in operation it follows that the zinc-depleted residues from the fluidization zone will be periodically or continuously removed through these pipes and will be replaced by fresh-pre-heated comminuted zinciferous material as described below.

A long hearth 32 comunicates with fluidization chamber 10. Secondary air for burning the zinc vapors is admitted to the top of fluidization chamber 10 and into hearth 32 through pipes 33 and 34 respectively which are provided with suitable valves 35 and 36 respectively. Comminuted zinciferous material is admitted to hearth 32 for pre-heating by any suitable feeder 37 and this material is moved along the hearth by any suitable reciprocating rake 38. The zinciferous material is progressively moved as it is heated toward the fluidization chamber 10. A combustion chamber 39 is in communication with hearth 32 through an opening 40 and the gases leaving the fluidization chamber 10 pass through hearth 32 and then into the combustion chamber. Secondary air is added at the end of the hearth through pipe 41 controlled by valve 42.

Combustion chamber 39 is provided with a trap 43 for the removal of any heavy particles which may settle therein. The zinc oxide which is formed in chamber 39 and the gases pass therefrom through pipe 44 which leads to suitable cooling tubes 45. Cooling tubes 45 connect in known manner through pipe 46 with suitable bag filters 47. The pigment zinc oxide is collected in packer 48 while the spent and clean gases of combustion are discharged to atmosphere through pipe 49 and suction fan 50.

As noted above I prefer to cycle the heating and reducing steps. The heating and reducing gases comprise a mixture of methane or other hydrocarbon gas and air which is passed through the pipe 20 and the jets 22 in the head of tuyere 16 at sufficient volume and velocity to maintain fluidization. For the heating step, the amount of air in this mixture is adjusted to provide maximum flame temperature at the jets, but during the reducing step the amount of air in the mixture is reduced so that the gaseous mixture issuing from the jets 22 is reducing in character. Any suitable type of gas mixing apparatus may be employed with this invention, such as that described in my Patent No. 2,416,044 of February 18, 1947. As shown in Fig. 1 herein, where such apparatus is schematically represented, a hydrocarbon gas such as methane is supplied through pipe 51 to a suitable pressure regulator 52 and from pressure regulator 52 through pipe 53 to the mixing unit 54. Air is taken into blower 55 through pipe 56, blower 55 being driven by motor 57, and the air under pressure passes through pipe 58 into mixer 54. Mixer 54 is provided with any suitable timing mechanism for changing the composition of the mixture at regulated intervals, and during the heating cycle delivers a combustible mixture to pipe 20 and during the reducing cycle delivers a reducing mixture to pipe 20. The cycling is completely automatic and when the apparatus has been heated and fluidization and reducing temperatures have been established, the duration of the heating and reducing steps may be on the order of approximately 2½ minutes each. The mixing unit and the pressures of the methane and air should be so arranged that velocities of gases emitted from the jets 22 will be on the order of from 1 to 5 feet per second vertical velocity at the jet level and calculated at reactor temperatures as opposed to velocities heretofore used in fluidization systems of from 0.2 to 1.0 foot per second. These higher velocities make it possible to use coarser particles of zinciferous material, prevent aggregation of the particles, and cause the (gangue bearing) materials to build up as individual particles rather than as aggregates.

The compositions of the reducing and heating gases provided by mixing unit 54 are of importance. On the heating cycle the mixture should have a slight excess of air so that the flame will be short and intense. This adjustment should be such as to restrict the burning in chamber 10 to a low level and a telltale 63 is provided to give a visual indication of the proper mixture. Telltale 63 may be a large Meeker burner with the air adjustment sealed shut which is attached by pipe 64 to pipe 20 and provided with a small pilot light burning natural gas. If the mixture delivered to the jets 22 is of optimum heating composition the flame about the grid of telltale 63 will be very short and will almost blow away from the grid. During the reducing cycle the flame burning at telltale 63 will be long, lazy and yellow. During the operation of my process the reducing and heating mixture should be checked occasionally by careful gas analysis. An analysis of suitable unburned mixtures is:

|  | Heating | Reducing |
| --- | --- | --- |
| $O_2$ | 9.5 | 13.7 |
| $N_2$ | 71.5 | 51.8 |
| $CH_4$ | 19.0 | 34.5 |
|  | 100.0 | 100.0 |

Referring now to Fig. 2 it will be seen that the particles of zinciferous material in the fluidization chamber 10 are, under the action of fluidization, separated into distinct zones. In the zone generally indicated at 57 directly above tuyere 16 almost perfect fluidization is present. Zone 57 is surrounded by a zone 58 more or less above the jets 22 where large bubbles of gas make the fluidization less perfect. Better fluidization occurs outside of zone 58 as in zone 59 and a dense zone of particles in almost non-fluidized condition exists in zone 60 adjacent the inner walls of chamber 10. Heavier particles of material tend to migrate downwardly in chamber 10 and collect beneath jets 22 in the zone 61. The mechanical action of tuyere 16 and paddles 26 together with the air admitted beneath skirt 24 and, when required, through pipes 25 keeps these heavier particles in zone 61 in agitated although not necessarily fluidized condition. The rising current of this air prevents the heavy zinc vapors from migrating downwardly into this area.

If the heavy zinc vapors were allowed to settle into the relatively cool heavy mass below tuyere 16 they would condense there and soon form such a dense and agglomerated charge as to stop the action of the tuyere. The fluidized condition above the tuyere would soon fail and the process would come to a halt.

From time to time the heavier particles in zone 61 may be removed through pipe 26'. Pipes 27 and 28 are employed to remove either continuously or periodically portions of the charge which may still contain some zinc and which may be reground if necessary and an appropriate fraction readmitted to the pre-heating hearth 32 with or without treatment to reduce the iron content thereof.

Above the fluidization zone in chamber 10 is a zone generally indicated at 62 which is a disengaging zone in which finer particles are not in fluidized condition but are in suspension in the upwardly directed gaseous current. A part of the reaction is carried out in this disengaging zone above the fluo-solid phase in the fluidization zone. During the heating cycle the reaction is carried on largely in the fluo-solid phase in the fluidization zone and when the reducing cycle begins reduction proceeds not only in the fluo-solid phase but in the gaseous phase above it in disengaging zone 62 where the finer particles are reduced in suspension.

Air should be introduced through pipe 33 into disengaging zone 62 during reduction to partially oxidize the zinc bearing vapors, providing some heat to maintain reduction temperatures in the fluidization zone beneath for a longer time, and preventing undue deposition of "hard oxide" on the furnace walls and rake. The admission of air through pipe 33 should be controlled so that air is admitted only during the reducing cycle. This air should be pre-heated and should be of sufficient quantity to convert a small part of the zinc to zinc oxide and a small part of the carbon monoxide and hydrogen into carbon dioxide and water vapor. The volume of air admitted through pipe 34 should also be controlled so that most of the remaining combustible gases coming from chamber 10 are burned as they pass through hearth 32 and the resulting vapor is used to rapidly pre-heat the comminuted zinciferous material therein. After the pre-heating step the partially oxidized vapors are mixed with more secondary air from pipe 41 and are oxidized completely in chamber 39.

It is important that the charge coming into the fluidization chamber 10 be pre-heated to a temperature at or above that existing in this chamber. Such pre-heating prevents aggregation caused by condensation of zinc vapors in the body of a cold charge and also increases the capacity of the fluidization chamber by reducing time required for heating.

When the apparatus as described above is first started to practice the process of the present invention the gas-air mixture provided by mixing unit 54 is adjusted to that mixture of air and gas which will give combustion of maximum temperature at nozzles 22. Combustion is completed as surface combustion as the gases pass upwardly through the chamber 10 and the temperature of the content of reaction chamber 10 increases rapidly together with that of the material which is being pre-heated in hearth 32 and pushed downwardly into chamber 10 by rake 38. The fluidized condition is soon established in chamber 10 due in part to mechanical agitation provided by tuyere 16. When the temperature of the fluidized charge in chamber 10 is sufficient for reduction of the zinciferous material of the charge the adjustment of mixing unit 54 is changed automatically. A great excess of combustible gas, natural gas or methane, with a slight amount of air is then blown into the fluidized charge in chamber 10. As this gaseous reducing mixture passes upward through the fluidized mass, reducing reactions progress according to the following well known equations:

1. $ZnO + CH_4 \rightarrow Zn + CO + 2H_2$
2. $ZnO + CO \rightarrow Zn + CO_2$
3. $ZnO + H_2 \rightarrow Zn + H_2O$ After a short interval of time, from 2½–5 minutes, the endothermic reduction reactions absorb enough heat from the material in the reaction chamber 10 to reduce the temperature below that required for effective reduction. Mixing unit 54 is then automatically changed to provide a combustible gas mixture to heat the charge in chamber 10 and heating continues until effective reducing temperatures are again established. When the process is in full operation the heating period may approach 2½ minutes duration and the reducing period 2½ minutes duration.

The charge fed to hearth 32 through feeder 37, as noted above, is comminuted calcined zinc concentrate or other high grade zinciferous material and contains substantially no solid combustibles. No solid carbon such as charcoal is required in the operation of this process and it is preferred that in the normal operation of the process no solid combustibles be used. Up to 10% of carbon or charcoal may be added when the apparatus and charge are heating at the beginning of the process to hold the combustion down in chamber 10 and to prevent flashing above the fluidization zone. The use of inert diluents is not necessary in this process and should be avoided, where possible, to reduce slag forming elements.

Unless the material from which zinc in vapor form has been withdrawn is removed from fluidization chamber 10 the concentrations of iron, lime, magnesium and silica will reach that point where incipient fusion begins and fluidization will then stop. Such material is therefore withdrawn from the fluidization chamber 10, in the manner described above, and will contain a substantial quantity of zinc. This withdrawn material may be screened through 20 mesh screen and the fines returned to feeder 37 with or without magnetic treatment to remove iron impurities.

Figure 3:
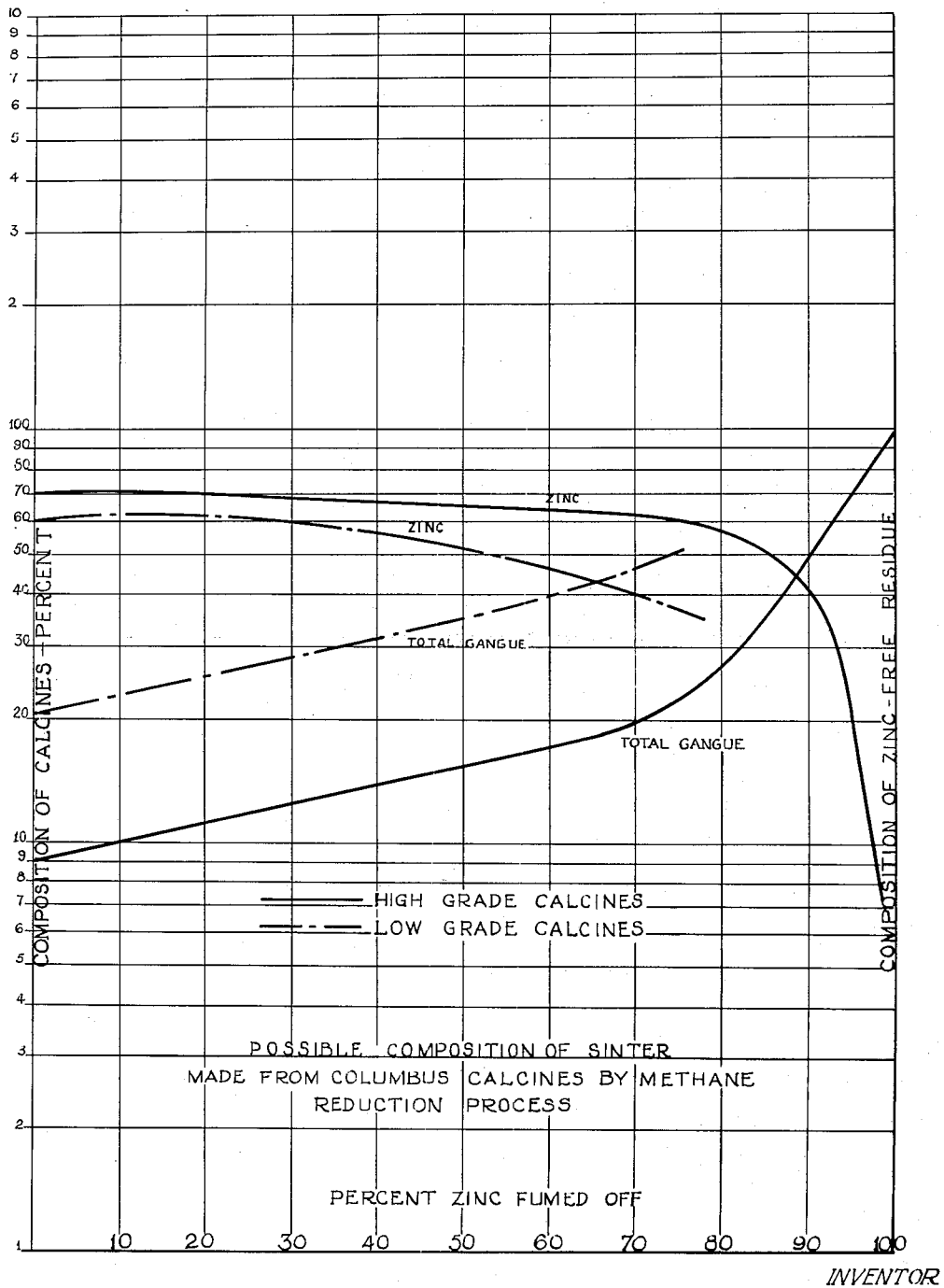
Fig. 3 is a graphic representation of the results obtained when the process of the invention is applied to starting materials of various compositions.

The advantages of using a gaseous reduction agent instead of the conventional solid fuel and the use of direct heating by gaseous fuel makes it possible to volatilize a relatively large percent of zinc from the charge before the impurities build up to the slagging point. Fig. 3 shows in graphic form the amount of zinc that can be fumed off of a charge of Mascot calcines averaging 70% zinc and 9% total impurities. The abcissa of this figure shows the percent of zinc fumed off and the ordinate is the composition of the material in chamber 10 in percent. Mascot concentrates have a starting composition of 70% zinc and 9% gangue materials. After 80% of the zinc content has been reduced and volatilized, the composition of the residue in chamber 10 has been reduced to 58% zinc and the gangue has risen to 27%. The material which is drawn from reaction chamber 10 through pipes 26', 27 and 28 still has a high zinc content for many metallurgical operations and could be used in retorting or in the Wetherill grate process for manufacturing zinc oxide. It may be seen from Fig. 3 that high elimination of zinc may be obtained and yet the zinc content of the charge is high enough to insure reduction rates near that of the feed material. The overall efficiency of the process is therefore extremely high when high grade concentrates are used. With a high grade charge the temperatures in chamber 10 may range from 1200 to 1300° C.

If the charge in chamber 10 is of low zinc content with high impurities the results of the process of the present invention are indicated in Fig. 3 on the low grade curves. The percentage of gangue material exceeds that of the zinc before an elimination of 50% of the zinc has been effected. With a low grade charge temperatures in excess of 1100° C. cannot be used in chamber 10, the reduction rate is slow and the gas efficiency is reduced, and a higher percentage of the material fed in must be drawn off. The process then, in effect, converts the low grade calcines to sinter of good quality and the sulfur, cadmium, lead and other volatile impurities are driven off with the zinc oxide. Such zinc oxide must be refined to remove these impurities, while with high grade calcines the zinc oxide produced by this process is of marketable quality.

Since the zinc oxide producing step is an endothermic step it is within the purview of the present invention to utilize any means for providing heat more rapidly to chamber 10. For example, this can be done by lining chamber 10 with an alloy steel and mounting the same in a furnace; by pre-heating the secondary air admitted through pipes 33, 34, and 41; and by pre-heating the mixture provided by mixer 54. The heat for these purposes can be supplied by recycling heat from any desirable stage in the process. The efficiency of the operation can also be improved by enriching the blast air from tuyere 16 with oxygen on both the heating and reducing cycle.

The preferred process of the present invention has been described above in which the heating and reducing steps are alternated or cycled but it is to be expressly understood that it is within the scope of the present invention to operate the process with an air-gas mixture sufficiently reducing to produce zinc vapors which are subsequently burned to zinc oxide but which contain enough air or oxygen to maintain the reaction chamber at the desired reducing temperature. This type of operation may be preferred when the cost of gas is low enough to make fuel economy of secondary importance. It should also be noted that other types of reducing gases may be used in conjunction with methane and reduction of the zinc oxide of the charge may be facilitated by the addition of carbon monoxide thereto.

It should now be apparent that the present invention provides a novel process for producing pigment zinc oxide utilizing gaseous heating and reducing agents to heat and reduce the fluidized charge of zinciferous material and thereafter to oxidize the zinc vapors passing from the fluidization zone to form the pigment zinc oxide which in every way satisfies the advantages described above for this novel process.

Changes in or modifications of the above described process may now be suggested to those skilled in the art without departing from the inventive concept and reference should therefore be had to the appended claims to determine the scope of this invention.

What is claimed is:

1. The process of manufacturing pigment zinc oxide which comprises maintaining a body of comminuted zinciferous material in a fluidized bed by passing current of mixed hydrocarbon gas and air through said bed, continuously adding zinciferous material to said fluidized body in particle size no coarser than 10 mesh and 70% coarser than 325 mesh, said current of mixed hydrocarbon gas having a vertical velocity through said bed of from one to five feet per second at reactor temperatures, alternately increasing and decreasing the air-hydrocarbon gas ratio to first produce a rapid heating condition in said body of zinciferous material and then to produce a strongly reducing condition therein, said alternations being so timed and ranging from approximately 5 to 2½ minutes that the temperature within said material does not fall below 1100° C. and does not exceed 1300° C., removing the evolved elemental zinc containing vapors obtained during the reducing cycles from the fluidized material, and mixing air with said zinc vapors to oxidize said vapors to zinc oxide.

2. The process of manufacturing pigment zinc oxide which comprises preheating comminuted zinciferous materials to temperatures from 1100 to 1300° C., maintaining a body of comminuted zinciferous material in a fluidized bed by passing a current of mixed hydrocarbon gas and air upwardly through said bed, continuously adding said preheated zinciferous material to said fluidized body in particle size no coarser than 10 mesh and 70% coarser than 325 mesh, said current of mixed hydrocarbon gas and air having a vertical velocity through said bed of from one to five feet per second at reactor temperatures, alternately increasing and decreasing the air-hydrocarbon gas ratio to first produce a rapid heating condition in said body of zinciferous material and then to produce a strongly reducing condition therein, said alternations being so timed and on the order of from 5 to 2½ minutes that the temperature in said material does not fall below 1100° C. and does not exceed 1300° C., removing the evolved elemental zinc containing vapors obtained during reducing cycles from the fluidized material, and mixing air with said vapors to oxidize said vapors to zinc oxide.

3. The process according to claim 2 in which said current of mixed hydrocarbon gas and air includes a methane-containing gas.

4. The process of manufacturing zinc oxide which comprises maintaining a body of comminuted zinciferous material in a fluidized bed by passing a current of methane-containing gas and air upwardly through said bed, continuously adding zinciferous materials to said fluidized body in particle size no coarser than 10 mesh and 70% coarser than 325 mesh, said current of methane-containing gas and air having a vertical velocity through said bed of from one to five feet per second at reactor temperatures, alternately increasing and decreasing the air-hydrocarbon gas ratio to first produce a rapid heating condition in said body of zinciferous material and then to produce a strongly reducing condition therein, said alternations being so timed that the temperature within said material does not fall below 1100° C. and does not exceed 1300° C., removing the evolved elemental zinc containing vapors obtained during reducing cycles from the fluidized material, mixing air with said vapors to oxidize said vapors to zinc oxide, and utilizing the heat from said vapors for preheating said comminuted zinciferous material before it is added to said fluidized body.

5. The process of manufacturing pigment zinc oxide as described in claim 4 in which the periods of alternately increasing and decreasing the air-hydrocarbon gas ratio for first producing a rapid heating condition in said body of zinciferous material and then producing a strongly reducing condition therein range from approximately five to two and one-half minutes duration.

6. The process of manufacturing pigment zinc oxide as described in claim 4 in which the preheated comminuted zinciferous material is continuously added to said fluidized body and material of reduced zinc content is continuously withdrawn from said fluidized body.

7. The process of manufacturing pigment zinc oxide as described in claim 6 in which the material of reduced zinc content continuously withdrawn from said fluidized bed is ground, concentrated and classified to pass a 20 mesh screen, and then returned to the supply of comminuted zinciferous material.

8. The process of manufacturing pigment zinc oxide which comprises maintaining a body of comminuted zinciferous material in a fluidized bed by passing a current of mixed hydrocarbon gas and air upwardly through said bed and by mechanical agitation, continuously adding zinciferous materials to said fluidized body in particle size no coarser than 10 mesh and 70% coarser than 325 mesh, said current of mixed hydrocarbon gas and air having a vertical velocity through said bed of from one to five feet per second at reactor temperatures, alternately increasing and decreasing the air-carbon gas ratio to first produce a rapid heating condition in said body of zinciferous material and then to produce a strongly reducing condition therein, said alternations being so timed that the temperature within said body does not fall below 1100° C. and does not exceed 1300° C., removing elemental zinc containing vapors obtained during reducing cycles from the fluidized material, and mixing air with said zinc vapors to oxide said vapors to zinc oxide.

9. The process of manufacturing pigment zinc oxide as described in claim 8 in which the air mixed with said zinc vapors to oxidize said vapors to zinc oxide is supplied thereto immediately above said fluidized bed, in which the resulting vapors are utilized to preheat the comminuted zinciferous material and in which air is then supplied to said vapors to oxidize the remaining elemental zinc vapors to zinc oxide.

References Cited in the file of this patent

UNITED STATES PATENTS

| | | |
|---|---|---|
| 1,014,062 | Hughes | Jan. 9, 1912 |
| 1,522,097 | Breyer et al. | Jan. 6, 1925 |
| 1,566,103 | Kirk | Dec. 15, 1925 |
| 1,618,204 | Johannsen | Feb. 22, 1927 |
| 1,754,170 | Johannsen | Apr. 8, 1930 |
| 1,893,913 | Saint-Jacques | Jan. 10, 1933 |
| 1,973,590 | Weaton et al. | Sept. 11, 1934 |
| 2,139,196 | Maidens | Dec. 6, 1938 |
| 2,370,977 | Lentz et al. | Mar. 6, 1945 |
| 2,416,044 | Calbeck | Feb. 18, 1947 |
| 2,525,790 | Garbo | Oct. 17, 1950 |
| 2,560,175 | Kalbach | July 10, 1951 |

OTHER REFERENCES

"Fluidization in Chemical Reactions" by John C. Kalbach, Chem. Eng., Jan. 1947, pages 105–108.